(No Model.)
C. W. HINMAN.
GAS METER.
No. 523,349. Patented July 24, 1894.
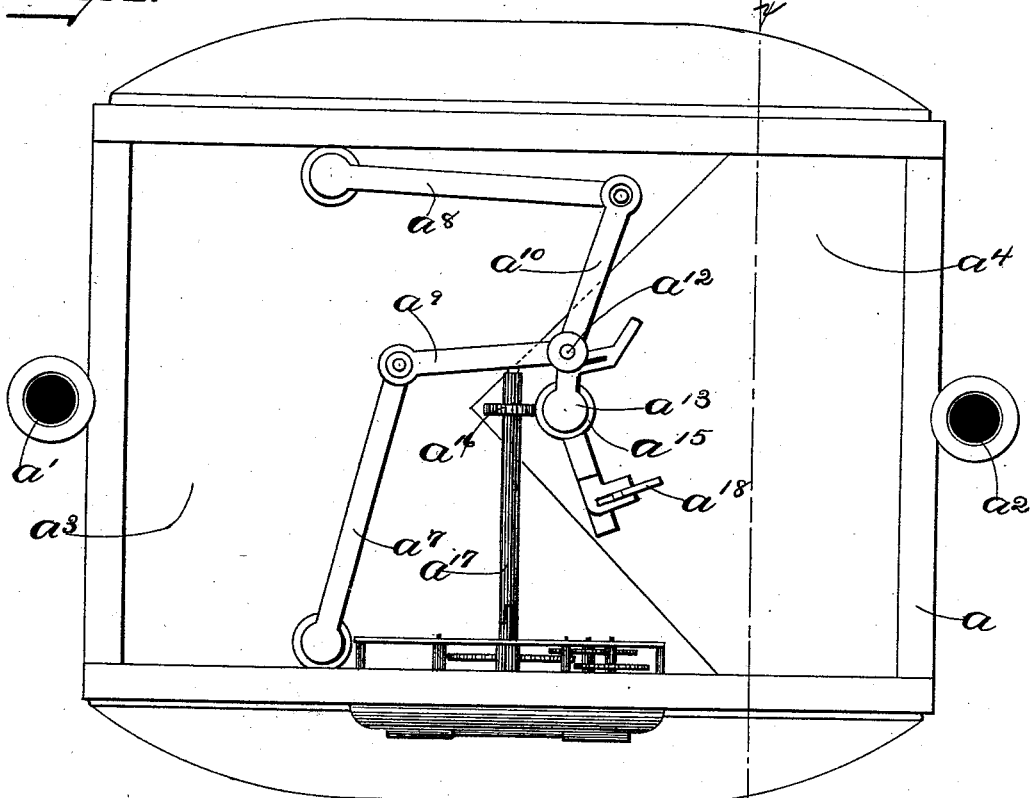
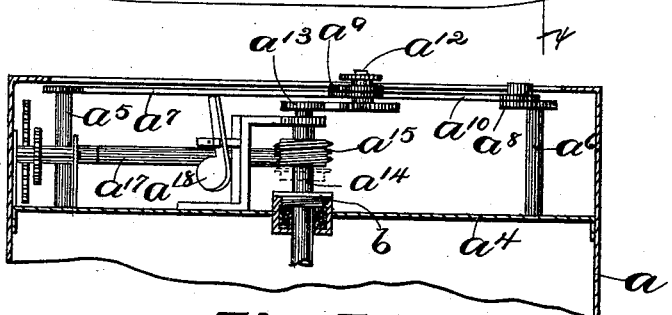
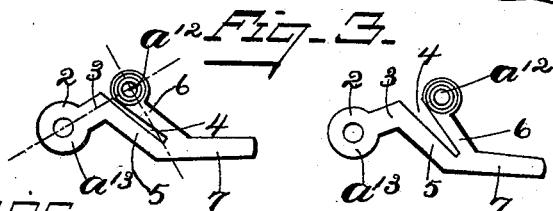
WITNESSES.
Charles B. Crocker.
Florence R. Davis.
INVENTOR.
Charles W. Hinman
by B. J. Hayes.
atty.

UNITED STATES PATENT OFFICE.

CHARLES W. HINMAN, OF BOSTON, MASSACHUSETTS.

GAS-METER.

SPECIFICATION forming part of Letters Patent No. 523,349, dated July 24, 1894.

Application filed January 25, 1894. Serial No. 498,048. (No model.)

*To all whom it may concern:*

Be it known that I, CHARLES W. HINMAN, of Boston, county of Suffolk, State of Massachusetts, have invented an Improvement in Gas-Meters, of which the following description, in connection with the accompanying drawings, is a specification, like letters and figures on the drawings representing like parts.

In dry gas meters as commonly constructed the reciprocating rods or shafts connected with movable diaphragms of the internal gas receivers, are connected by a suitable link connection to a crank arm which is secured to a rotatable rod or shaft which is connected with the valve mechanism. This crank arm has been made adjustable, by providing it with external screw threads, placing a sliding collar thereon to which the link connections are attached, and providing two adjusting nuts, one at each side of said sliding collar. There are two essential objections to this particular form of adjustable crank arm, first that the adjusting nuts become loosened in time, thereby permitting the collar to slide on the arm; and second that the space at the upper part of the meter, above the usual floor, being very limited in height, and so much space being taken up by this particular form of adjustable crank arm, it becomes a very difficult undertaking to repack the stuffing box of the rod or shaft to which said crank arm is attached, as said stuffing box is located in the floor just beneath the crank arm, and if in order to repack said stuffing box the crank arm is removed, as well as the adjacent parts, the meter must be totally readjusted when said arm and the adjacent parts are replaced.

This invention has for its object to provide a gas meter with an adjustable crank arm, so constructed and arranged that the above objections may be remedied, and consists in details of construction of said crank arm as will be hereinafter pointed out and claimed.

Figure 1, shows in plan view a gas meter provided with an adjustable crank arm embodying this invention; Fig. 2, a sectional view of the upper part of the meter, showing the adjustable crank arm and parts co-operating therewith in side elevation. Fig. 3, shows two separate views of the adjustable crank arm removed, showing its different adjusted conditions.

The box $a$, having the gas inlet and outlet tubes $a'$, $a^2$, the floor $a^3$, $a^4$, near the upper end of the box $a$, the reciprocating rods or shafts $a^5$, $a^6$, which are connected with the usual diaphragms of the bellows like gas receivers, and crank arms $a^7$, $a^8$, secured thereto, the links $a^9$, $a^{10}$, connecting said crank arms with a stud $a^{12}$, which is supported by the adjustable crank arm $a^{13}$, secured to the rotating valve rod or shaft $a^{14}$, having secured to it a worm $a^{15}$, which engages a worm wheel $a^{16}$, secured to the rod or shaft $a^{17}$, which is connected with the indicator are all as usual in gas meters of ordinary construction, with the exception of the adjustable crank arm $a^{13}$, which forms the subject matter of this invention. This crank arm is best shown in Fig. 3, and consists of a flat piece of metal having a hub or collar 2, which embraces the rod or shaft $a^{14}$, a short arm or portion 3, projecting therefrom, a portion projecting at an angle from said arm 3, slitted as at 4, dividing it in two parts 5 and 6, and a tail piece 7, projecting from said slitted portion 5, 6, which is adapted to co-operate with any usual or suitable pawl $a^{18}$, to prevent the crank arm from turning backward. In the outer or free end of the part 6, of said slitted portion, a stud $a^{12}$ is mounted, having thereon a suitable washer or collar to slightly elevate the links which are connected to said stud $a^{12}$. Adjustment is accomplished by moving the stud $a^{12}$ toward and from the rod or shaft $a^{14}$, thereby giving a greater or less throw to the crank arm, and reciprocating the rods or shafts $a^5$, $a^6$, more or less accordingly. To move said stud $a^{12}$ away from the shaft $a^{14}$ the parts 5, 6, of the slitted portion are spread, bending the material, and opening the slit 4, and to move the stud toward the shaft $a^{14}$, the parts 5, 6, are pressed toward each other, closing the slit 4.

Two different positions, it will be seen, are shown in Fig. 3.

The slitted portion 5, 6, is so arranged with relation to the arm 3, that when the parts are in their mean position, a line intersecting the stud $a^{12}$ and lower end of the slit 4, will be at right angles to a line intersecting the stud $a^{12}$, and center of the hub 2.

The parts or arms 5, 6, may be separated or pressed together by any suitable implement.

By constructing the adjustable crank in this manner it will be seen that the stud $a^{12}$ is moved in the arc of a circle on an axis eccentric to the axis upon which the crank arm turns, but the eccentricity is such, and the direction of the part 6, with relation to its adjacent parts is such that the stud moves toward and from the shaft $a^{14}$.

The adjustment may be easily made without disturbing or removing any of the other parts, and when once accomplished there is no danger of any change or variation taking place. Furthermore by providing a bearing for the stud $a^{12}$ directly on the crank arm, instead of on a sliding collar which is made large enough to afford bearing surfaces for the adjusting nuts, as in the common construction heretofore referred to, the space occupied by said collar is avoided. The crank arm is also so thin, occupying so little space, that there is ample room to raise the screw cap $b$ of the stuffing box upon the shaft $a^{14}$ sufficiently, as represented by dotted lines Fig. 2, to enable said stuffing box to be repacked, without removing or disconnecting any of the parts.

I claim—

1. In a gas meter, the combination of the rotating shaft $a^{14}$, connected with and operating the indicator, an adjustable crank arm bearing a stud which is adjustable in a curved line toward and from the shaft $a^{14}$, and intermediate connections connected with said stud and with the reciprocating shafts $a^5$, $a^6$, of the meter, substantially as described.

2. In a gas meter, the combination of a rotating shaft $a^{14}$, connected with and operating the indicator, an adjustable crank arm secured thereto, having two integral portions 5, 6, the portion 5, being connected with the shaft, and the portion 6, being adjustable toward and from the part 5, by bending, and intermediate connections connected with the free end of said part 6, and with the reciprocating rods or shafts $a^5$, $a^6$, substantially as described.

3. In a gas meter, the adjustable crank arm consisting of a thin flat plate comprising a hub 2, arm 3, angular portion 5, 6, slitted at 4, stud $a^{12}$ supported at the free end of the part 6, which is adjustable toward and from the center of the hub 2, by opening and closing the slit 4, substantially as described.

4. In a gas meter, an adjustable crank arm consisting of a hub 2, adapted to be connected with a shaft, having an arm bearing a stud, said arm being adjustable to move the stud toward and from the hub, the parts being so arranged that a line intersecting the stud and axis of its adjustable arm, is substantially at right angles to a line intersecting said stud and the center of the hub, substantially as described.

In testimony whereof I have signed my name to this specification in the presence of two subscribing witnesses.

CHARLES W. HINMAN.

Witnesses:
B. J. NOYES,
C. B. CROCKER.